(No Model.)  2 Sheets—Sheet 1.
C. J. MILLER.
CORN PLANTER.
No. 505,168. Patented Sept. 19, 1893.
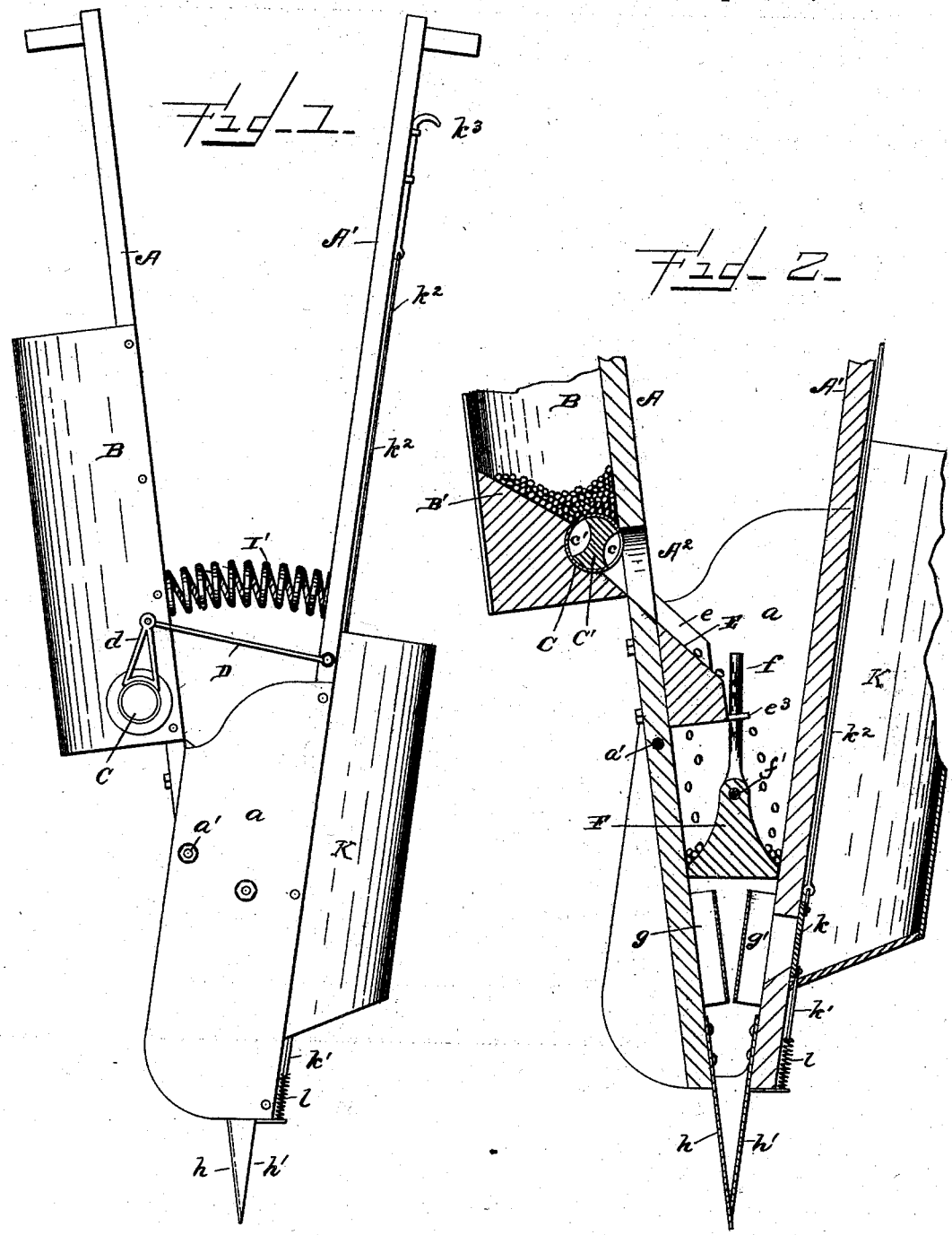
Witnesses=
N. J. Collamer
J. H. Jochum Jr.
Inventor=
Christopher J. Miller,
By A. M. Smith & Son
Attorneys.

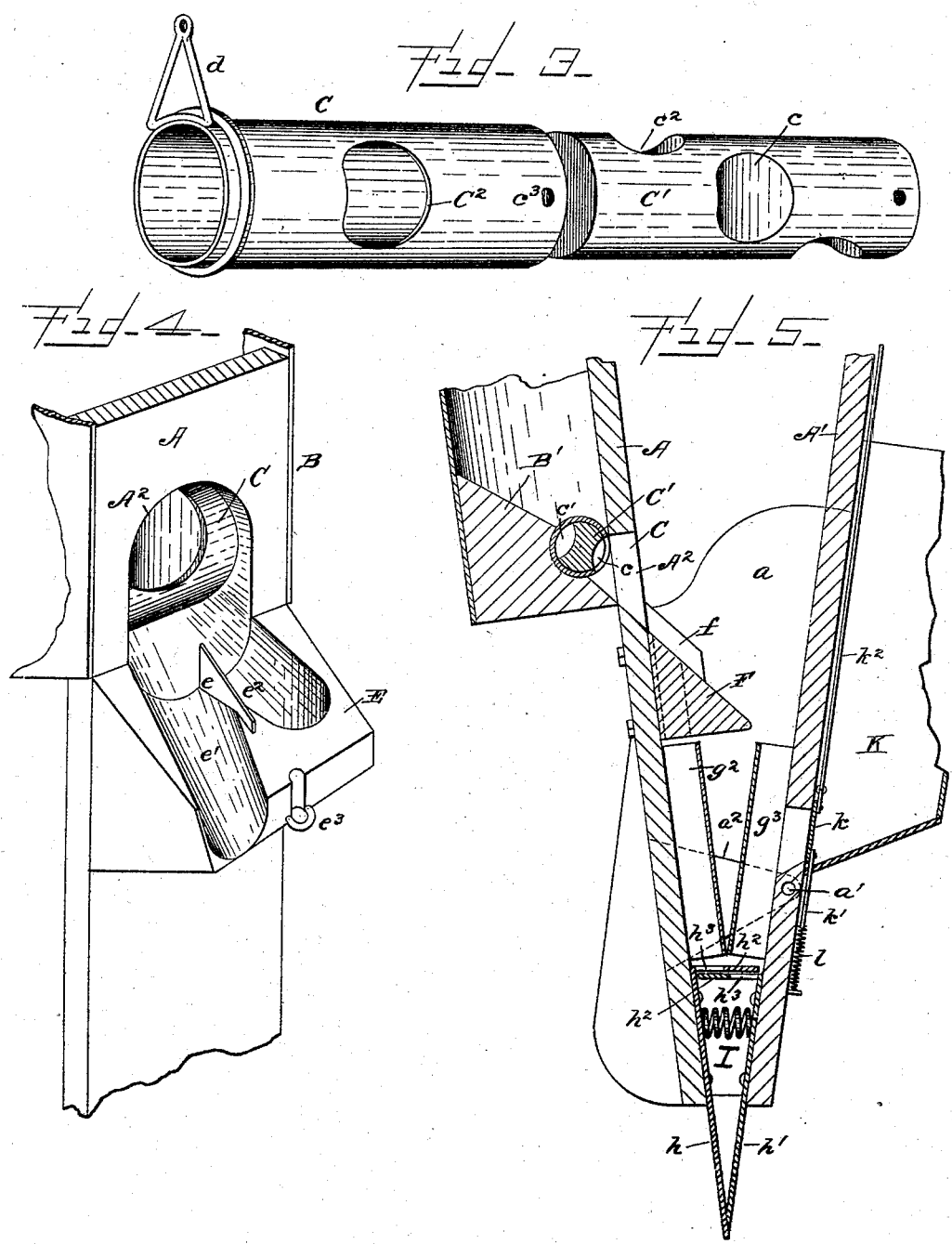

UNITED STATES PATENT OFFICE.

CHRISTOPHER J. MILLER, OF MARION, OHIO.

CORN-PLANTER.

SPECIFICATION forming part of Letters Patent No. 505,168, dated September 19, 1893.

Application filed January 21, 1893. Serial No. 459,126. (No model.)

*To all whom it may concern:*

Be it known that I, CHRISTOPHER J. MILLER, a citizen of the United States, and a resident of Marion, in the county of Marion and State of Ohio, have invented a new and useful Improvement in Corn-Planters, of which the following is a full, clear, and exact description, reference being had to the accompanying drawings, making part of this specification.

My invention relates to that class of hand or walking corn planters employing two arms or blades, pivotally connected one with the other and by the vibration of which toward or away from each other the seed discharging devices are operated and the seed deposited on the ground, and, it consists in a novel construction of the seed-discharging cylinder for measuring or gaging the quantity of seed to be planted: in an arrangement of lower cut-off, for scattering the seed in discharging the same: in the combination with the planter of means for planting other seed than corn, such, for example, as pumpkin seed or beans, simultaneously with the corn, but at greater intervals and at the option of the operator; in an arrangement of spring or springs for automatically spreading the handles of the blades and closing the discharge end thereof, and, in certain details of construction and arrangement of parts, all as hereinafter described and claimed.

In the accompanying drawings,—Figure 1 represents my improved planter in side elevation. Fig. 2 represents a vertical section through the lower end and operative parts of the same. Fig. 3 is a perspective view of the parts of the seeding cylinder, detached. Fig. 4 is a perspective view of a portion of the blade carrying the hopper and cylinder, showing the dividing chute-board thereon, and, Fig. 5 is a section, similar to Fig. 2, but showing a modification in the form of the lower cut-off.

A and A' indicate the two blades or handles of the planter, made, preferably, of wood and one of which has sheet metal cheek-plates $a, a$, rigidly secured to it and overlying the edges of the opposing blade, to which they are connected by a through bolt or pivot at $a'$, thereby connecting the blades pivotally and permitting them to be vibrated, one toward or away from the other. Straps $a^2$, independent of the cheek plates $a$, may be employed, if preferred, for pivotally connecting the blades, as shown in Fig. 5.

B indicates the hopper, secured to the outer face of one of the blades and provided with a recessed bottom B', inclined on its upper face, toward the blade, as shown. Within a semi-cylindrical recess in said inclined upper face of the bottom, is located a transversely arranged cylinder C, the ends of which extend through and are journaled in the side walls of the hopper, adjacent to the blade, which is perforated at $A^2$, in the horizontal plane of the cylinder, to permit the passage through it of the seed discharged by the cylinder. The cylinder is composed of two parts, viz:—a core C', having a series of pockets $c, c'$ $c^2$, &c., formed in its periphery, of different sizes or capacities, and, an outer, hollow, cylindrical casing (C), having a single perforation $C^2$, with which any one of the pockets $c, c'$, &c., may be made to register and said parts may be held at the desired adjustment by a set screw passing through the casing C at $c^3$, and engaging the core, or by other suitable means for the purpose.

The casing cylinder C is provided at one end with an upright arm or lever $d$ from which a pivoted link D extends to and is connected with the opposing blade A' in such manner that as the blades are vibrated the cylinder will be rocked or vibrated to receive and discharge the seed in a manner that will be readily understood.

The pockets $c, c'$, as stated, are of different capacities, varying from three to six or more grains of corn and discharge through the opening upon an inclined chute-board E, which is provided with a dividing tongue $e$ and with two grooves and points of discharge, one at $e'$, extending the full length of the inclined chute, and the other $e^2$ terminating in close proximity to the blade A, in a vertical perforation through the chute board, for dividing the seed and discharging it upon opposite sides of a wedge-shaped, lower cut-off F, for a purpose which will appear. The wedge-cut-off F stands with its point or edge up and is provided thereon with an upwardly extending pin $f$, which passes up through a loop or staple $e^3$, secured in the outer end of the chute board and which serves to hold the wedge in proper working relation thereto. A through bolt or pivot at $f'$, secures the wedge to the cheek plates $a$, $a$, the wedge serving in connection with said cheek plates and the handles or blades A and A' to form two compartments as shown in Fig. 2, in which the grain passing through the opening and off of the chute board is deposited. The lower end or base of the wedge is of just sufficient thickness to cause the blades A and A', when brought together at their lower ends to rest against the sides thereof and so as to form what I term a "lower cut-off" whereby the grain is held until the lower ends of the blades are separated, when the corn is allowed to drop from the opposite sides of the wedge, and to pass through conductors $g$, $g'$, to the ground. By this arrangement the corn is held until the metallic extensions $h$, $h'$, on the lower ends of the blades, are well separated, when the seeds drop well scattered on the ground. The wedge may be located below the conductors, if preferred.

In Fig. 5 a modification in the form of the lower, seed-scattering cut-off is shown. In this the dividing chute-board delivers the corn directly into the two conductor chutes $g^2$, $g^3$, the lower ends of which, when the blades are brought together at their lower ends, are closed by the overlapping flanges $h^2$, $h^2$, at the upper ends of the blade extensions $h$ and $h'$. These flanges are perforated at $h^3$ and when the lower ends of the blades are opened, the corn drops from the conductors $g^2$ and $g^3$ through said perforations to the ground.

I, Fig. 5, indicates a spiral spring, applied between the blades near their lower ends, for automatically closing said ends when the power for separating them is withdrawn. In Fig. 1, the spring is shown at I', applied above the connecting pivot for forcing the upper ends of the blades apart; either or both arrangements of the spring may be used.

K indicates a hopper, for containing other seed than corn, such as pumpkin seed, beans, &c., and applied to the blade A', which has an opening through it communicating with the conductor tube $g'$ or $g^3$. A slide $k$ covers the opening, held in place by means of a spring $l$, connecting with a rod $k'$ passing through the bottom of the hopper. A rod or wire $k^2$ extends from the slide $k$ through suitable guide loops up to near the handle, where it is provided with a hook $k^3$. When it is desired to discharge seed from the hopper K the operator, with his finger resting in the hook $k^3$, raises the slide $k$ and allows seed to escape through the opening in the blade to the conductor tube, whence it passes, with the corn therein, to the ground. The operator can thus deposit such seed with every second, third, fourth or fifth planting of corn, or say, from eight to twenty or more feet apart, as may be desired.

Modifications may be made in the form of the lower cut-off, as explained, and of the springs and other parts, without departing from my invention, and, where the wedge form of cut-off is employed, it may be located below, instead of above the conductor tubes, as stated, in which case the conductors will be arranged as shown in Fig. 5.

Having thus described my invention, I claim as new—

1. In a hand corn-planter the combination with the seed hopper, of the seed cylinder composed of the core having pockets of different capacities in combination with and adjustable in the perforated inclosing casing for said core, substantially as described.

2. The seed discharging cylinder composed of the core having a series of pockets of varying capacities and the inclosing, perforated casing therefor, substantially as described.

3. In a corn-planter the combination with the seed hopper of the pocketed cylinder for taking the seed from said hopper, the divided chute receiving the seed from said cylinder, and a lower cut-off intermediate said chute and the lower end of the planter, substantially as described.

4. In a corn-planter the dividing chute-board and means for discharging the seed from the hopper thereon, in combination with the pivoted planter blades, and, two compartments for the seed and a cut-off located below the chute-board, substantially as described.

5. The combination in a corn-planter, of the pivoted blades or handles carrying the hopper and means for discharging the seed therefrom, the dividing chute-board, the wedge operating in connection with the blades to form a lower cut-off and a spring operating to close said cut-off, substantially as described.

6. The combination in a corn-planter, of the hopper B, a corn dropping device connected therewith, a lower cut-off for catching the seed discharged from said hopper, a second hopper for other seed, and means controlled by the operator, independent of said corn-discharging device for discharging such other seed, substantially as described.

7. The combination in a corn-planter, of the pivotally connected blades, the hoppers B and K, for corn and other seed, connected therewith, the seed discharging attachment to said hoppers, the dividing chute F, the cut-off intermediate the said chute and the ends of the blades and the spring or springs for automatically closing said cut-off, substantially as described.

In testimony whereof I have hereunto set my hand this 30th day of March, A. D. 1892.

CHRISTOPHER J. MILLER.

Witnesses:
M. R. McGILL,
GEORGE D. COPELAND.